United States Patent [19]
DeFelice et al.

[11] Patent Number: 6,014,011
[45] Date of Patent: Jan. 11, 2000

[54] BATTERY CHARGING SYSTEM FOR PORTABLE ELECTRONIC DEVICES

[75] Inventors: Richard Alden DeFelice, Bernardsville; Ronald David Slusky, Highland Park, both of N.J.

[73] Assignee: Lucent Technologies Inc., Murray Hill, N.J.

[21] Appl. No.: 09/327,936

[22] Filed: Jun. 8, 1999

[51] Int. Cl.[7] .................................................. H02J 7/00
[52] U.S. Cl. ........................................... 320/114; 320/107
[58] Field of Search ..................................... 320/114, 107, 320/DIG. 12; 429/96–100

[56] References Cited

U.S. PATENT DOCUMENTS

| 5,155,428 | 10/1992 | Kang | 320/136 |
|---|---|---|---|
| 5,483,276 | 1/1996 | Brooks et al. | 348/2 |
| 5,867,797 | 2/1999 | Hashimoto | 320/114 |

*Primary Examiner*—Peter S. Wong
*Assistant Examiner*—Lawrence Luk
*Attorney, Agent, or Firm*—Ronald D. Slusky

[57] ABSTRACT

A battery charging system for cellular telephones or other portable devices is incorporated into a clock radio. A user is enabled to specify a time-of-day at which s/he wants to be reminded to insert the rechargeable battery into the charging system if re-charging is needed. No alarm is generated if the battery is already in the charging system at the appointed time. A low power radio frequency signal attempts to interrogate the portable device on the assumption that it is within radio range at that time so as to determine the current battery charge status at about the time that the alarm would be generated. If the charging system receives a return signal from the portable device which indicates, or from which it can be determined, that charging is not needed, then the alarm is not generated after all. Otherwise, the alarm is, in fact generated.

21 Claims, 2 Drawing Sheets

BATTERY CHARGING SYSTEM FOR PORTABLE ELECTRONIC DEVICES

BACKGROUND OF THE INVENTION

The present invention relates to battery charging and, in particular, to the charging of batteries used in portable devices such as cellular telephones.

Advances in integrated circuit and battery technology have enabled the ongoing reduction in the size of many electronic devices, such as cellular telephones. Among the advantages of this size reduction are reduced manufacturing costs, reduced power consumption and enhanced convenience for the user. For example, the original cellular phones were not unlike traditional military CB radios and, as such, were large and heavy. By contrast, some cellular phones now on the market are so small as to be able to be carried comfortably in one's pocket or purse.

Portable re-chargeable electronic devices such as cellular telephones must be connected to a power supply to re-charge their batteries. These devices typically employ some form of warning signal such as a beeping tone, warning light or vibration that indicates when the battery requires re-charging. Some devices even have a more sophisticated system which indicates battery charge level continuously. These systems are deployed as integral parts of the portable device or as part of the battery pack of the portable device.

SUMMARY OF THE INVENTION

The aforementioned warning systems are effective only when the warning signal is heard, seen or felt by the user so that the device can be re-connected to its re-charging supply. At times, however, the user may not be in close proximity to the device when the warning signal sounds—for example, when the phone is left turned on in a purse or coat pocket that is hung in a closet at the end of a day—and so the device can discharge its battery completely, thereby leaving it useless when needed.

The present invention is directed to a battery charger warning system that overcomes this problem. In particular, we have recognized that it is advantageous to provide a low battery warning capability not only at the portable device, as in the prior art, but also at the battery charging system. In particular, the invention is directed to a battery charger warning system that generates an alarm signal if a) the battery is not present in the charger and also b) at least one other time criterion is met or it has been determined (such as in the manner described herein) that a battery associated with the charging system requires recharging.

In particular embodiments of the invention, a time criterion is determined by having the charging system include alarm-clock-like circuitry which enables the user to select, or specify, a time-of-day at which the user wants to be reminded to insert the battery into the charging system if re-charging is needed. The charging system could be located in the user's kitchen, with the time-of-day being set to the user's accustomed meal time. Or it could be located at the user's bedside, with the time-of-day being set to the user's accustomed bedtime. Thus the user will typically be in the vicinity of the alarm when it goes off and will thus be prompted to retrieve the portable device from wherever it is and to insert it into the charging system. Again, as noted above, no alarm will be generated if the battery is already in the charging system at the appointed time. An alternative to having the system generate the alarm at a particular time-of-day is for the alarm to be generated at predetermined intervals, e.g., every ten hours.

The use of a time criterion addresses the possibility that the battery may need to be re-charged. In reality, however, it may not require re-charging. In accordance with a feature of the invention, the actual (as contrasted with the possible) need for the battery to be re-charged can be determined by the charging system itself. For example, the system may generate a low power radio frequency signal which attempts to interrogate the portable device, the assumption being that the portable device is within radio range, e.g. somewhere in the user's house. as to the current battery charge status at about the time that the alarm would be generated. (In other embodiments the battery pack itself may be capable of monitoring for, and responding to, the interrogation signal.) If the charging system receives a return signal from the portable device which indicates, or from which it can be determined, that charging is not needed, then the alarm is not generated after all. Otherwise, the alarm is, in fact generated.

DETAILED DESCRIPTION

Figure 1:
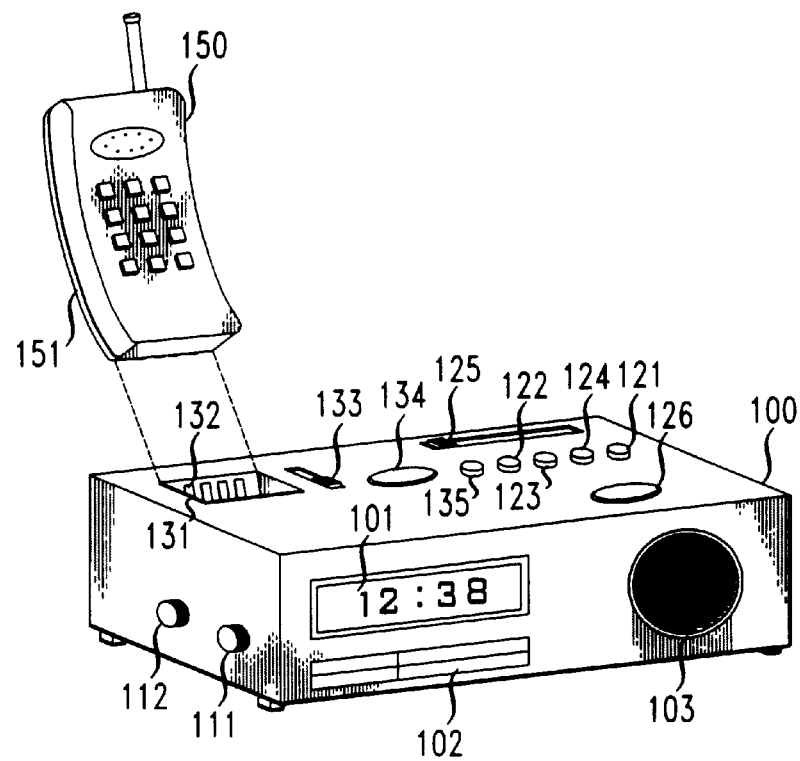
FIG. 1 depicts a clock radio which incorporates a battery charging system embodying the principles of the present invention.

Clock radio 100 in FIG. 1 includes a number of conventional components including clock display 101, radio station indicator scale 102, loudspeaker 103, volume and tuning control dials 111 and 112, respectively, and a number of buttons and/or switches associated with the clock's alarm function. The latter, in particular, include a) set clock and set clock alarm buttons 121 and 122 which, when depressed, allow the user to set the time-of-day and time-of-wake-up-alarm, respectively, in conjunction with hour button 123 and minute button 124, b) slide switch 125, which enables the user to set the clock radio in its off, radio, radio alarm and buzzer alarm modes, and c) snooze alarm 126. Clock radio 100 is adapted to receive a re-chargeable battery 151 or portable device 150—illustratively a cellular telephone—to which battery 151 is attached. To this end, clock radio 100 further includes charging receptacle 131 into which battery 151 or the combination of battery 151 and portable device 150 can be placed. Receptacle 131 includes charging contacts 132. In accordance with the invention, clock radio 100 further includes warning alarm on/off switch 133, alarm silence button 134 and set warning alarm button 135. The manner in which elements 131 through 135 are operated to achieve the functionality provided by the invention is discussed in detail hereinbelow.

Figure 2:
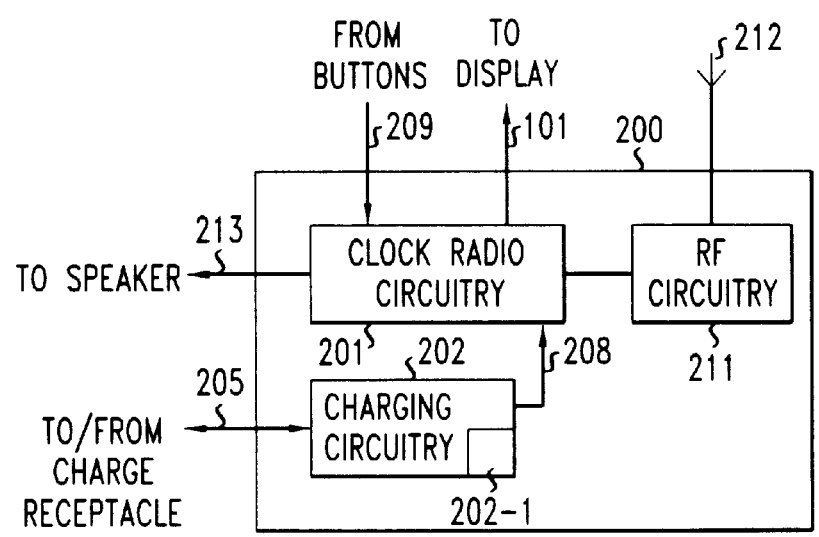
FIG. 2 is block diagram of illustrative circuitry within the clock radio of FIG. 1.

FIG. 2 is block diagram of illustrative circuitry 200 within the clock radio of FIG. 1. The circuitry includes clock radio circuitry 201 which provides all of the logic and control, clock and radio functionalities of the clock radio. Circuitry 201 illustratively comprises one or more integrated circuit chip(s) that provide(s) AM/FM radio tuning, audio amplification, timing and logic functions and other functionalities necessary for operation of the clock radio as described herein. Inputs from the various control buttons and switches are provided to circuitry 201 via leads 209. The clock radio also includes charging circuitry 202, which supplies charging current over leads 205 to a re-chargeable battery inserted in receptacle 131 with or without an attached portable device and which also provides a "battery present" logic signal to circuit 201 via leads 208. In addition to AM/FM broadcast radio frequency circuits within circuitry 201, the clock radio includes polling radio frequency circuitry 211 and antenna 212 which enable the charging system to implement a feature of the invention as described hereinbelow.

Figure 3:
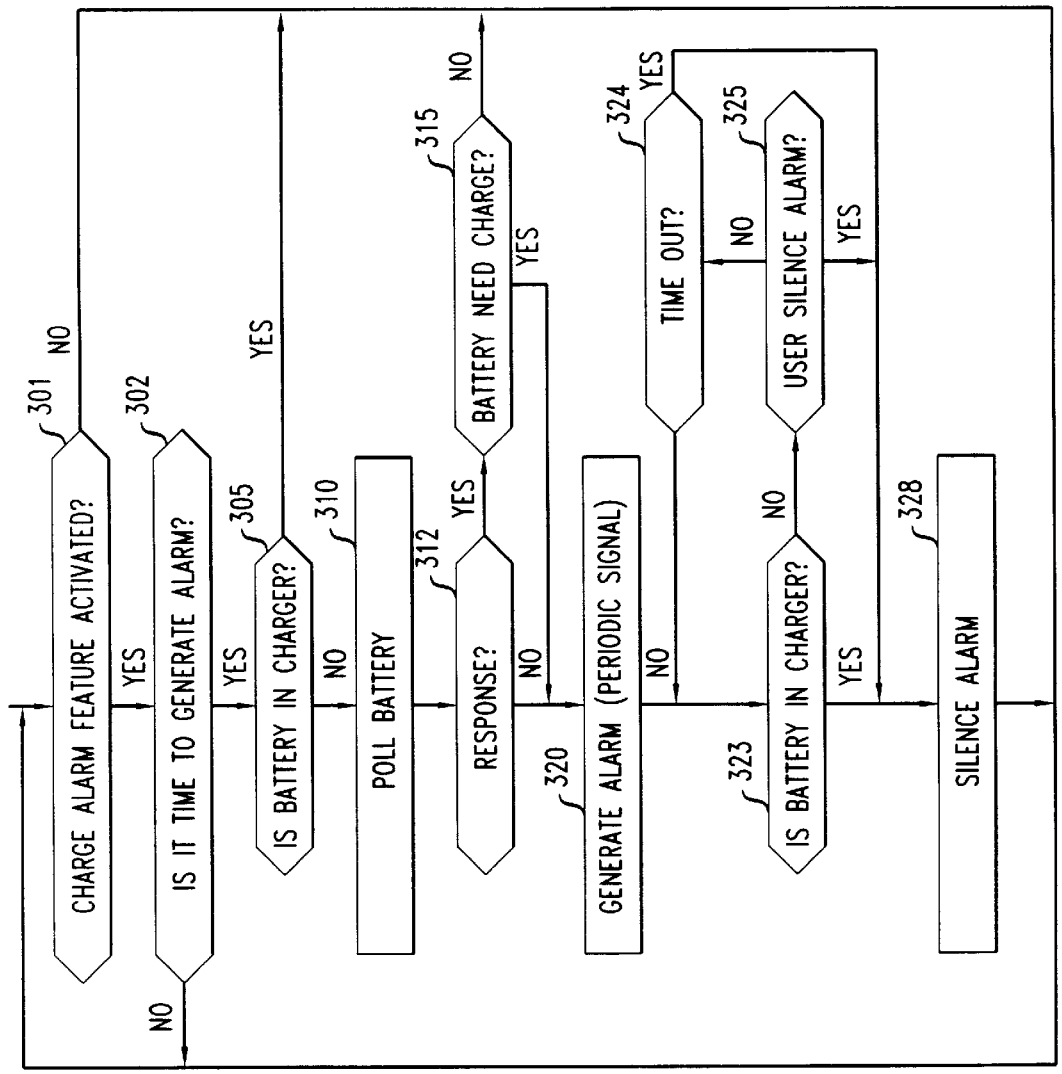
FIG. 3 is a flowchart of operations performed by the circuitry in implementing the principles of the invention.

In accordance with the principles of the invention, clock radio 100 generates an alarm signal if no battery is present in charging receptacle 131 and there is a real or potential need for the battery to be re-charged. In this embodiment, more particularly, the clock radio determines the potential need for battery re-charging on a time basis and, more particularly, on a time-of-day basis, as implemented by the steps of the routine depicted in the flowchart of FIG. 3.

Thus as indicated at step 301, the clock radio circuitry first checks the position of switch 133 to determine if the charge alarm feature of the invention is enabled. If it is not, the routine does nothing other than loop back to this step to re-check the switch status at a subsequent point in time. Using buttons 135, 123 and 124, the user has previously selected a time at which s/he wishes the clock radio to generate a battery charge alarm if no battery is present in receptacle 131, the latter fact being indicated to circuitry 201 over leads 208. At the present point in time, the routine determines at step 302 whether that time has arrived, that is whether it is time to generate the alarm. If not, the routine continuously loops back to step 301 until the answer at step 302 is YES. A check is then made at step 305 as to whether a battery is already present in the receptacle. If it is, there is no need to generate any alarm and routine again loops back to step 301. However, if there is no battery present, the routine proceeds onward. The functions performed by the succeeding steps 310, 312 and 315 are described below. For the present, it will be assumed that the flow of control has passed to step 320. It thus having been determined that the charge alarm feature has been activated, the time to generate the alarm has arrived and that there is no battery in the receptacle, a battery charge warning alarm is generated at step 320. That alarm is illustratively in the form of a synthesized human voice applied to loudspeaker 103 over leads 213 speaking the words "Please insert battery" which illustratively is repeated once every five minutes until one of two things happens. If, as determined at step 323, a battery has been placed in the receptacle, a change in the signal generated by charging circuit 202 on leads 208 causes clock radio circuitry 201 to silence the alarm, as indicated at step 328. Alternatively, if it was determined at step 323 that a battery was not been placed in the receptacle, the routine continues on to step 325 at which it determines whether the user has chosen to manually override the alarm generation by depressing alarm silence button 134. If that did happen, the routine continues to step 328 and silences the alarm. Otherwise, it loops back to step 323, until either a battery is inserted or button 134 is depressed. (If desired, the routine may include a time-out feature 324 wherein it returns automatically to step 301 if, after a predetermined period of time, a battery was not placed in the receptacle and button 134 was not depressed.) Alarm silence button 134 only silences the present ongoing alarm generation but does not de-activate the feature per se. Thus the alarm will be generated at the next set time—assuming the battery is not in place already. Complete deactivation of the feature is effectuated by moving switch 133 to the OFF position.

The above-described operation of the clock radio generates the battery charge alarm based upon the potential need for the battery to be charged. However, the portable device may not actually need re-charging when the alarm is generated. In accordance with a feature of the invention, the charging system—by itself or in conjunction with the portable device—can determine the actual, as contrasted with the potential, need for the battery to be re-charged.

Clock radio 100 indeed incorporates such a feature. Thus after it has been determined at step 305 that there is no battery in the receptacle, but before generating the battery charge alarm at step 320, the routine of FIG. 3 performs step 310, at which clock radio circuitry 201 causes polling radio frequency (RF) circuitry 211 to send to portable device 150 a low power RF signal via antenna 212. This signal attempts to interrogate an associated portable device (or the battery pack directly) on the assumption that it is within radio range, the interrogation being as to the current battery charge status at about the time that the alarm would be generated. (Techniques of the type described in U.S. Pat. No. 4,736,404 issued Apr. 5, 1988 to Anglikowski et al can be used to enable the clock radio to communicate with a particular portable device and/or battery back.) If the system receives, via antenna 212 and RF circuitry 211, a return signal from the portable device which indicates, or from which it can be determined, that charging is not needed, (that is, information which is a function of the charge status of the battery) then step 320 is not performed after all and no battery charge warning alarm is generated and the routine returns to step 301. Otherwise, the alarm is, in fact generated at step 320 as previously described.

The portable device utilizes a certain amount of battery power to monitor for the aforementioned interrogation signal. In order to minimize battery drain, the portable device may use techniques similar to those used in U.S. Pat. No. 4,731,814 issued Mar. 15, 1988 to Becker et al in order to cause the portable device to periodically activate and deactivate the interrogation signal monitoring circuitry.

In the claims hereof, any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function. The invention defined by such claims resides in the fact that the functionalities provided by the various recited means are combined and brought together in the manner which the claims call for. Applicant thus regards any means which can provide those functionalities as equivalent to those shown herein.

The foregoing merely illustrates the principles of the invention and many variations are possible. For example, the system could provide the opportunity for the user to set more than one alarm time in a 24-hour period. Or, rather than using a predetermined time-of-day as the basis for determining the potential need for battery re-charging, the system may generate the alarm upon the elapse of a time interval, such as every ten hours. Battery charge life varies over the lifetime of the battery, typically getting shorter as the number of charge/discharge cycles increases. Therefore, logic or so-called fuzzy logic can be used in conjunction with a battery charge monitoring circuit 202-1 to automatically determine the mean time between charges based upon the charge state of the battery over a period of multiple charging cycles, and thereby determine an appropriate interval for generating the alarm signal. (Such a battery charge monitoring circuit could be a circuit of the type used in the so-called gas gauge function of the LTC1325 battery management system manufactured by Linear Technology Corporation.) Such an approach can be enhanced by providing a display of expected battery charge life at the charger. Further enhancements can be made with software that communicates with the charging base and provides a history of battery charge cycles and/or predicts when a new battery will be required.

Although the invention is disclosed herein as being part of a clock radio, it could be incorporated into other devices or could be manufactured as a stand-alone charging base with a computer interface or having a time display and the necessary correct buttons and/or switches.

The battery charge alarm is disclosed herein as a synthesized voice that repeats the alarm intermittently. However, it could be implemented as any desired visual, audio, tactile or other signal and could be continuous rather than intermittent.

The functions performed by the circuitry implementing the invention can be of any desired type including, but not limited to special-purpose logic and control circuits, appropriately programmed application-specific integrated circuits and/or digital signal processor hardware or a general purpose processor operating under program control.

It will thus be appreciated that those skilled in the art will be able to devise yet various further alternative arrangements which, although not explicitly shown or described herein embody the principles of the invention and thus are within their spirit and scope.

We claim:

1. Apparatus comprising charging means for receiving and re-charging a re-chargeable battery, and means for generating an alarm in response to a determination that a) a battery is not present in said charging means and also that b) at least one predetermined time criterion is met.

2. The invention of claim 1 wherein said predetermined criterion is that the present time-of-day is a particular selected time-of-day.

3. The invention of claim 2 further comprising means by which a user can select said time-of-day.

4. The invention of claim 1 wherein said predetermined criterion is the elapse of a time interval.

5. The invention of claim 4 wherein the duration of said time interval is fixed.

6. The invention of claim 4 further comprising means monitoring the charging characteristics of a battery recurrently inserted in said charging means and wherein the duration of said time interval is a function of said characteristics.

7. The invention of claim 1 further comprising means for determining whether a particular battery not then present in said charging means needs to be re-charged, the generating of said alarm being inhibited if the determination is that said battery does not need to be re-charged.

8. The invention of claim 7 wherein said determining means includes means for receiving a radio frequency signal carrying information which is a function of the charge status of said particular battery.

9. Apparatus comprising charging means for receiving and re-charging a re-chargeable battery, and means for generating an alarm in response to a determination that a) a battery is not present in said charging means and also that b) a battery associated with said charging means requires re-charging.

10. The invention of claim 9 wherein said alarm generating means makes said determination at at least a first selected time-of-day.

11. The invention of claim 10 further comprising means by which a user can select said time-of-day.

12. A method for use by a device which includes charging means for receiving and re-charging a re-chargeable battery, the method comprising the step of generating an alarm in response to a determination that a) a battery is not present in said charging means and also that b) at least one predetermined time criterion is met.

13. The invention of claim 12 wherein said predetermined criterion is that the present time-of-day is a particular selected time-of-day.

14. The invention of claim 13 further comprising means by which a user can select said time-of-day.

15. The invention of claim 12 wherein said predetermined criterion is the elapse of a time interval.

16. The invention of claim 15 wherein the duration of said time interval is fixed.

17. The invention of claim 15 comprising the further step of monitoring the charging characteristics of a battery recurrently inserted in said charging means and wherein the duration of said time interval is a function of said characteristics.

18. The invention of claim 12 further comprising the further step of determining whether a particular battery not then present in said charging means needs to be re-charged, the generating of said alarm being inhibited if the determination is that said battery does not need to be re-charged.

19. The invention of claim 18 wherein said determining step includes the step of receiving a radio frequency signal carrying information which is a function of the charge status of said particular battery.

20. A method for use by a device which includes charging means for receiving and re-charging a re-chargeable battery, the method comprising the step of generating an alarm in response to a determination that a) a battery is not present in said charging means and also that b) a battery associated with said charging means requires re-charging.

21. The invention of claim 20 wherein said determination is made at at least a first time-of-day selected by a user.

* * * * *